(12) United States Patent
Drønen

(10) Patent No.: US 12,607,116 B2
(45) Date of Patent: Apr. 21, 2026

(54) APPARATUS, A PRODUCTION STRING COMPRISING THE APPARATUS, AND A METHOD FOR ESTIMATING A PRODUCTION FLOW RATE AT A CERTAIN POSITION OF A WELL

(71) Applicant: Completion Tracer AS, Harstad (NO)

(72) Inventor: Ole Magnar Drønen, Harstad (NO)

(73) Assignee: Completion Tracer AS, Harstad (NO)

( * ) Notice: Subject to any disclaimer, the term of this patent is extended or adjusted under 35 U.S.C. 154(b) by 289 days.

(21) Appl. No.: 18/689,455

(22) PCT Filed: Sep. 7, 2022

(86) PCT No.: PCT/NO2022/050207
§ 371 (c)(1),
(2) Date: Mar. 6, 2024

(87) PCT Pub. No.: WO2023/038530
PCT Pub. Date: Mar. 16, 2023

(65) Prior Publication Data
US 2025/0003332 A1      Jan. 2, 2025

(30) Foreign Application Priority Data
Sep. 9, 2021    (NO) .................................... 20211083

(51) Int. Cl.
*E21B 47/11*        (2012.01)
*G01F 1/704*        (2006.01)

(52) U.S. Cl.
CPC .............. *E21B 47/11* (2020.05); *G01F 1/704* (2013.01)

(58) Field of Classification Search
CPC .......... E21B 47/11; E21B 43/14; G01F 1/704; G01F 15/185
See application file for complete search history.

(56) References Cited

U.S. PATENT DOCUMENTS

2014/0343908 A1* 11/2014 Nyhavn .................. E21B 47/11
703/2
2015/0176396 A1    6/2015 Nyhavn
(Continued)

FOREIGN PATENT DOCUMENTS

EP        3039225        7/2016
EP        3262281        1/2018
(Continued)

OTHER PUBLICATIONS

Search Report for European Patent Application No. 22867782.9.
(Continued)

*Primary Examiner* — Francis C Gray
(74) *Attorney, Agent, or Firm* — Andrus Intellectual Property Law, LLP

(57)        ABSTRACT
An apparatus and a method for estimating a production flow rate at a certain position of a well, the apparatus has a compartment being in fluid communication with a fluid within a pipe for forming part of a production string via a first passage and a second passage. A portion of wellbore fluid within the pipe is urged through the compartment by a flow diverter provided at least at one of the at least first passage and the at least one second passage. A ratio between a flow (Fi, Fo) through the compartment and the flow (F) through the pipe is constant, wherein the constant ration is known from tests and/or calculations. A measured flow through the compartment is used for estimating a flow through the pipe of the apparatus.

20 Claims, 6 Drawing Sheets

(56)     References Cited

U.S. PATENT DOCUMENTS

| | | | |
|---|---|---|---|
| 2018/0038223 A1* | 2/2018 | Nyhavn | .................. E21B 47/11 |
| 2021/0199003 A1 | 7/2021 | Nyhavn | |
| 2022/0098975 A1* | 3/2022 | Huseby | .................. E21B 43/14 |
| 2022/0235649 A1* | 7/2022 | Sperle | ..................... E21B 49/08 |

FOREIGN PATENT DOCUMENTS

| | | | |
|---|---|---|---|
| GB | 2469488 A | 10/2010 |
| GB | 2586697 A | 3/2021 |
| GB | 2586698 A | 3/2021 |
| WO | 2020167135 A1 | 8/2020 |

OTHER PUBLICATIONS

Norwegian Application No. 20211083, Search Report dated Apr. 8, 2022, 2 pages.
PCT/No. 2022/050207, Written Opinion dated Nov. 7, 2022, 5 pages.

* cited by examiner

APPARATUS, A PRODUCTION STRING COMPRISING THE APPARATUS, AND A METHOD FOR ESTIMATING A PRODUCTION FLOW RATE AT A CERTAIN POSITION OF A WELL

CROSS-REFERENCE TO RELATED APPLICATIONS

This application is the U.S. national stage application of International Application No. PCT/NO2022/050207, filed Sep. 7, 2022, which international application was published on Mar. 16, 2023 as WO 2023/038530 A1 in the English language. The International Application claims priority to Norwegian patent application No. 20211083, filed Sep. 9, 2021. The international application and Norwegian application are all incorporated herein by reference, in their entirety.

FIELD

The present disclosure relates to an inflow indicator apparatus for a well in an underground structure. More particularly, the disclosure is related to an apparatus, a production string comprising the apparatus, and a method for estimating a production flow rate at a certain position of a well, such as a hydrocarbon producing well.

BACKGROUND

Production flow rates, i.e., inflow rates at different zones of a producing well are valuable data for modelling a reservoir, planning well interventions and production effect of infill drilling.

When monitoring the inflow into a production string from different production zones in an underground well, it is known to use tracers that are dissolved in the fluid flowing into the well and up through the production tubing. Tracers of different characteristics are often used to provide an understanding of the inflow situation in different parts of the well. Typically, different types of tracers are used at different depths in the well to provide an overview of the inflow into different sections of the well. Most commonly used are tracers which can provide indications of what phase (water or oil) that is flowing into the different parts of the well, by tracers reacting differently on contact with a fluid type being used, for example tracers that are dissolvable only in contact with water, but non-dissolvable in contact with hydrocarbons. Tracers can also be used to give an indication of whether decreasing inflow is due to beginning precipitation of deposits in the well, or whether the decreasing inflow is due to the reservoir being depleted.

The tracers are arranged in an apparatus that is lowered into the well before the measuring starts. Such an apparatus may form part of a permanent well installation. Typically, the apparatus containing the tracer material forms part of the lower completion, for example such as a sand screen with integrated tracer depots. The tracer depot or source may be formed by as dissolvable salts that are typically contained in non-dissolvable block material positioned in contact with the fluid flow passing through the apparatus. There is available in the market tracer sources that are reactive to various types of fluids such as water and hydrocarbons, and are released gradually and over a long time, typically 3 years or even longer.

Publication GB2586698 discloses a method of monitoring influx of a fluid to a hydrocarbon producing well, the method comprising: providing at least one tracer release apparatus connected to a production string in a hydrocarbon producing well at an influx location, the tracer release apparatus comprising: a fluid volume; at least one tracer material located in the fluid volume; at least one outlet to the fluid volume; and at least one controllable valve configured to selectively control the flow of fluid through the at least one outlet. A position of the valve is controlled by means of varying the production flow rate. By closing the valve, an increased concentration of the tracer within the fluid volume is achieved. By opening the valve, fluid, and the tracer flow from the fluid volume to the production string, create an increased concentration of tracer in the production string; and detecting the presence of tracer downstream of the influx location. The method relies upon a position of the valve.

Publication GB2586697 discloses a tracer release system being based on the method disclosed in GB2586698. The valve disclosed in said publication avoids shutting in the producing well.

Publication GB2469488 discloses a tracer-based logging tool with zero moving parts deployed on a logging cable to traverse across the well bore of any given oil or gas well and which comprise a series of tracer combination of particular arrangement to maximize fluid contact with the tracers for the primary purpose to directly measure any fluid phase entry intervals as the tool is moved up or down the wellbore and, which incorporates a design that creates a torque balance that keeps the logging cable from turning.

Publication US2021199003 discloses a method of estimating an influx profile for at least one well fluid to a producing petroleum well with two or more influx zones or influx locations to a production flow. The well comprises tracer sources with distinct tracer materials in known levels of the well, wherein at least one of said tracer sources is arranged at or downstream and exposed to the fluids in at least one of said influx zones, and wherein each said tracer sources has an even release rate to said well fluid. The method comprising the steps of: analysing samples of production fluid for concentration and type of tracer material, the samples having been collected from the production flow at a location downstream of the tracer sources at known sampling times after inducing a transient in the production rate thereby changing the local exposure times of the tracer sources to the fluid to create a tracer transient; and based on the analysed concentrations and type of tracer materials in the samples as a function of the sampling times, calculating said influx profile.

From US2015176396A1 a system and a method for estimating fluid flow rates for each one of several separate production zones in a multilayer reservoir to a well extending through the reservoir are known. Distinct tracer sources are placed in known positions in the inflow path of each inflow zone which is defined from a so-called reservoir base line in the well by means of an entry point. There will often be pressure variations along the wellbore which can affect the results of the method described. This can result in situations where tracers flow into other zones during shut-in. Such crossflow presents uncertainties and can affect the accuracy of flow rate analysis.

There is a need for an apparatus and a method for estimating a production flow rate at a certain position of a well, wherein the tracers are subject to the flow within the production pipe only, while at the same time the apparatus operates without any movable parts.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect of the invention there is provided an apparatus for estimating a production flow rate at a certain position of a well, the apparatus comprises:

a pipe for forming part of a production string in a wellbore, the pipe having a first end portion and a second end portion, and a compartment arranged on an outside portion of the pipe, the compartment houses a source of releasable tracer.

The pipe is provided with at least one first passage through a wall of the pipe for communicating a portion of a wellbore fluid into the compartment, and a least one second passage for communicating the portion of the wellbore fluid that has passed through the first passage, and tracer being released from the source of tracer, back into the pipe, wherein the portion of wellbore fluid within the pipe is urged through the compartment by means of a non-movable flow diverter provided at least at one of the at least first passage and the at least one second passage, and wherein the flow diverter and the passages are configured so that, in use in a producing well, a ratio between a flow through the compartment and a flow through the pipe is constant, and known from tests and/or from calculations, based for example on a CFD model (Computerized Flow Dynamics) that is based on finite element analysis, as will be discussed below.

The compartment is in fluid communication with the flow through the pipe only, and not in direct communication with the formation fluid while the formation fluid flows into the wellbore. This has the effect that the apparatus may be arranged at any position downstream of a drainage device, such as a sand screen or a perforated portion of the production casing.

The effect of the flow diverter provided at least at the first passage, is that it is possible to obtain reliable results with respect to estimating the portion of wellbore fluid within the pipe being urged through the compartment for the actual range of flow rate through the pipe at the position of the compartment. Tests has surprisingly shown that a flow diverter provides very reliable results for estimating any flow rate through the pipe, as will be discussed below, and shown in FIG. 3b. Without any flow diverter, tests have shown that flow rate through the compartment is none reliable as it provides non-linear and unexpected results for various flows as will be discussed below and shown in FIG. 6b of this document.

The flow diverter may be provided by means of an obstruction protruding from an inner surface of the pipe downstream at the at least one first passage. The effect of the obstruction arranged downstream at the at least one first passage is that the obstruction will provide a local increase in pressure, and thereby urging a portion of the fluid flowing in the pipe, into the compartment.

As an alternative to, or additionally to a flow diverter in the form of an obstruction at the at least one first passage, the flow diverter at the inlet of the at least one first passage may be provided by arranging the at least one first passage inclined so that an inlet of the at least one first passage at the inner surface of the pipe is closer to the first end portion of the pipe than the portion of the at least one first passage facing the compartment.

In one embodiment of the apparatus, a combination of an inclined first passage and an obstruction is provided by providing a pipe having a first inner diameter from an upstream portion of an inlet of the at least one first passage, and a second diameter from a downstream portion of the inlet of said passage, wherein the first inner diameter is larger than the second inner diameter of the pipe.

In one embodiment of the apparatus is the flow diverter is provided by means of an obstruction protruding from an inner surface of the pipe upstream at an outlet of the at least one second passage. An obstruction protruding from an obstruction protruding from an inner surface of the pipe upstream at the at least one outlet of the at least second outlet has the effect of providing a local pressure reduction, a venturi-like effect, in the fluid flowing in the pipe, and thereby sucking the portion of the fluid within in the compartment, into the pipe.

As an alternative to, or additionally to a flow diverter at the second passage in the form of an obstruction at the at least one second passage, the flow diverter may in one embodiment of the apparatus be provided by arranging the at least one second passage inclined so that an outlet of the at least one the second passage at the inner surface of the pipe is closer to the second end portion of the pipe than the portion of the at least one second passage facing the compartment.

In one embodiment of the apparatus, a combination of an inclined second passage and an obstruction is provided by providing a pipe having a first inner diameter from a downstream portion of an inlet of the at least one second passage, and a second diameter from an upstream portion of the inlet of said passage, wherein the first inner diameter is larger than the second inner diameter of the pipe.

From the above, it should be clear that a configuration of the at least second passage may be mirrored with respect to the at least one second passage about an axis being perpendicular to a longitudinal axis of the pipe.

The apparatus may remain in place in the wellbore as part of the production string even after the tracer have been fully expended, i.e., when the compartment having housed the tracer.

In a second aspect the invention there is provided wellbore production string comprising the apparatus according to the first aspect of the invention, and a formation drainage device for allowing formation fluid to flow into the wellbore production string, wherein the drainage device is arranged upstream the apparatus.

Due to the compartment of the apparatus being in fluid communication only with the fluid within the pipe, a formation drainage device, typically a sand screen or a perforated portion of a production liner, the apparatus may be arranged axially distant downstream from formation drainage device. Thus, the apparatus and the formation drainage device may be axially spaced-apart by a solid walled production liner. One advantage of this is that the configuration of the production string is more flexible.

The production string may typically comprise at least two apparatuses arranged alternating in series with the formation drainage devices. Again, one or more of the apparatuses and the formation drainage devices may be spaced-apart by solid walled production liner(s).

In a third aspect of the invention, there is provided a method for estimating a production flow rate at a certain position of a well, wherein the method comprising:

inserting into a wellbore a production string comprising the apparatus according to the first aspect of the invention and a formation drainage device arranged upstream of the apparatus, and start producing the well;

when production flow through the apparatus is to be estimated, at least reducing production flow to allow tracer being released from the source of tracer material to accumulate in the compartment of the apparatus;

re-open the well to a desired production flow rate and collect samples of fluid at a topside of the well to detect tracer concentration from the accumulated tracer in the production flow to record a time-window after the re-opening through which the accumulated tracer is detected; and based on the time window, a known volume of the compartment, and the known ratio between the flow through the compartment and the flow through the pipe of the apparatus, estimating a flow rate at that the location of the apparatus.

By the term at least reducing production flow, is meant that the well may, but does not have to be completely shut in. A ratio between the flow through the compartment and the flow through pipe of the apparatus is relatively small, for example, but not limited to, $1/1000$. This means that even if there is some production flow through the pipe of the apparatus, a portion of the fluid being diverted through the compartment, is substantially negligible with respect to draining the tracer being released from the source of tracer material. A small flow through the pipe of the apparatus will still allow tracer to accumulate in the compartment.

Although a wellbore production string may comprise only one apparatus, it may oftentimes be a need for more than one apparatus to estimate production flow rates at different positions of the well. Thus, in one embodiment, the method may comprise providing the wellbore production string with two or more apparatuses and appurtenant formation drainage devices.

To serve its intended purpose, each apparatus of the two or more apparatuses has at least one formation drainage device arranged upstream thereof.

In one embodiment, the method may further comprise providing at least neighbouring apparatuses with sources of distinctive tracers. This will facilitate separation of tracer concentrations, so-called tracer-shots, arriving at top of the well, for example on a production rig. In one embodiment wherein the production string comprises a plurality of apparatuses according to the invention, the method may comprise providing for example each second apparatus with identical tracers. However, in an alternative method each apparatus may be provided with sources of distinctive tracers.

BRIEF DESCRIPTION OF THE DRAWINGS

In the following is described examples of preferred embodiments illustrated in the accompanying drawings, wherein:

FIG. 1a shows a cross section of one embodiment of the apparatus according to the invention;

FIG. 1b shows a cross section through A-A of FIG. 1a;

FIG. 6b shows graphs of flow rates through compartment vs. flow rate passing the apparatus shown in FIG. 6a for different axial lengths of compartments of the apparatus shown in FIG. 6a.

Figures 1A, 1B:
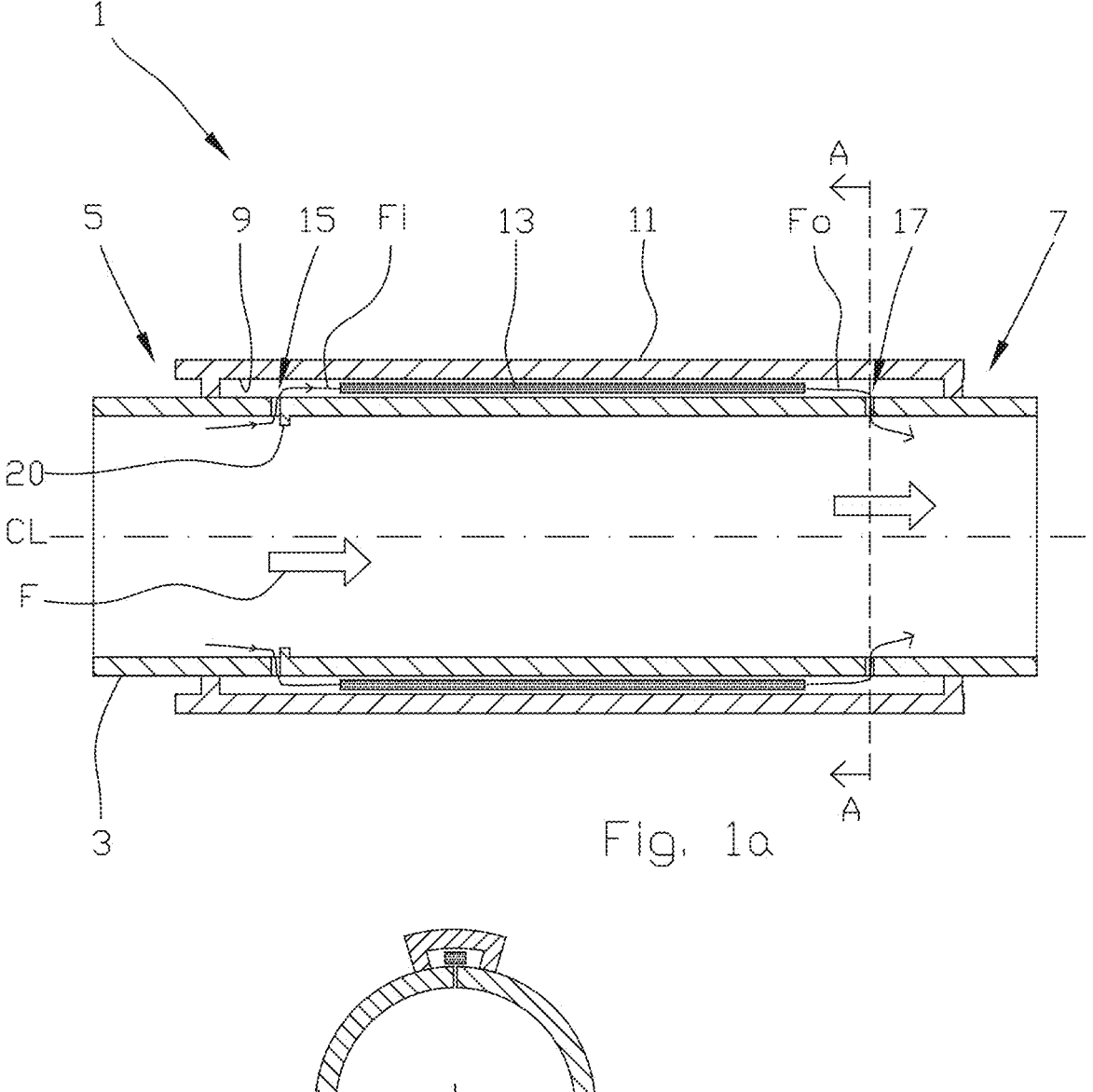

Any positional indications refer to the position shown in the figures.

DETAILED DESCRIPTION OF THE EMBODIMENTS

In the figures, same or corresponding elements are indicated by same reference numerals. For clarity reasons some elements may in some of the figures be without reference numerals.

A person skilled in the art will understand that the figures are just principle drawings. The relative proportions of individual elements may also be strongly distorted.

In FIGS. 1-3a, 4, and 5, reference numeral 1 denotes an apparatus according to the present invention.

The apparatus 1 comprises a pipe 3 having a first end portion 5 and a second end portion 7. In the embodiments shown, compartments 9 (two shown) are arranged on an outside portion of the pipe 3. The compartments 9 are defined by compartment housings 11 and an outer surface of the pipe 3. In the embodiment shown in FIG. 1b, the housings 11 are arranged at a top portion and a bottom of the pipe 3, so that each compartment 9 and housing 11 covers an arclength of the outer surface of the pipe 3. The apparatus 1 comprises two identical compartments 9. For this reason, only the compartment 9 arranged on top of the pipe 3 is discussed. However, in an alternative (not shown) the apparatus 1 may comprise only one, or three or more compartments 9. In still another embodiment (not shown) the compartment may be formed by an annulus arranged on an outside of the pipe 3. In such an embodiment, the compartment 9 typically comprises two or more sources 13 of tracers.

Each compartment 11 houses a source 13 of releasable tracer.

In the embodiments shown, each compartment 11 is in fluid communication with a fluid within the pipe 3 via a first passage 15, here in the form of an aperture, and a second passage 17 also shown in the form of an aperture.

The first passages 15 and the second passages 17 are configured for providing fluid communication between the fluid within the pipe 3 and the respective compartments 9.

When wellbore fluid is flowing through the pipe 3 of the apparatus 1, as illustrated by arrow F, a portion of the wellbore fluid is communicated into the compartments 11, via the first passages 15, as illustrated by arrow Fi, while the second passages 17 communicates the portion of the wellbore fluid that has passed through the first passages 15, and tracer being released from the sources 13 of tracer material, back into the pipe 3, as illustrated by arrow Fo.

Due to the passages 15, 17 through the wall of the pipe 3, the compartments 9 will be subject to the fluid within the pipe 3, also when there is no flow through the pipe 3. However, as long as the tracer source 13 is responsive to the fluid, tracer will be released from the tracer source 13. Without any flow through the pipe 3, there will be no flow through the compartment 9. Consequently, there will be an accumulation of tracer released within the compartments 9. Such an accumulation of tracer from the tracer source 13 will take place even with a minor flow through the compartment if the rate at which the tracer is released from the tracer source 13 exceeds the rate at which the released tracer flows together with the wellbore fluid back into the pipe 3 via the second passage 17.

A formation of accumulated tracer within the compartment 9 is essential for the purpose of the present invention because the accumulated tracer may provide a tracer cloud or tracer "shot" that can be detected topside of a well, for example on a rig. By bringing such a tracer shot out of the well by means of re-open the well, a time lag from start to end of detecting the tracer shot topside is used to estimate flow through the pipe 3, as will be discussed in further details below.

However, to obtain reliable results with respect to estimating the flow F through the pipe 3, a ratio between the wellbore fluid flowing through the compartment 9 and the pipe 3 must be known.

Figure 6A:
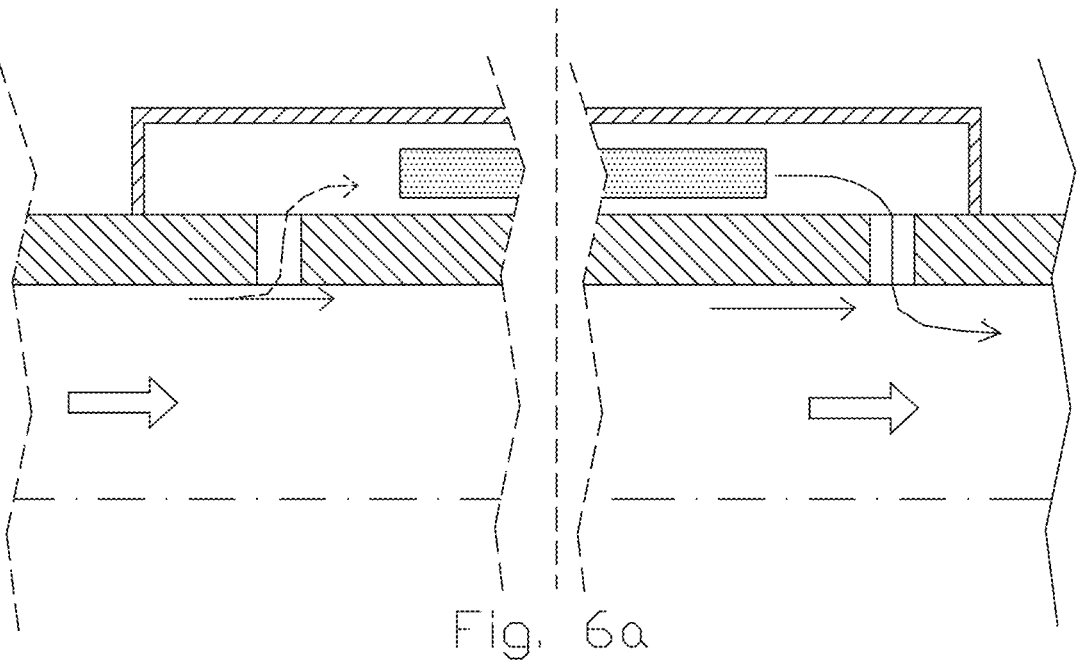
FIG. 6a shows a cross section of an upper portion apparatus that is not part of the present invention.

From comprehensive calculations and tests, the inventor has surprisingly found that such reliable results cannot be achieved simply by providing passages as illustrated in FIG. 6a, i.e., providing an inlet and an outlet being perpendicular to a longitudinal axis CL of the pipe 31. To achieve reliable results with respect to the ratio between the wellbore fluid flowing through the compartment 9 and the pipe 3, a flow diverter should be provided at least at one of the first passage 15 and the second passage 17.

Figure 2:
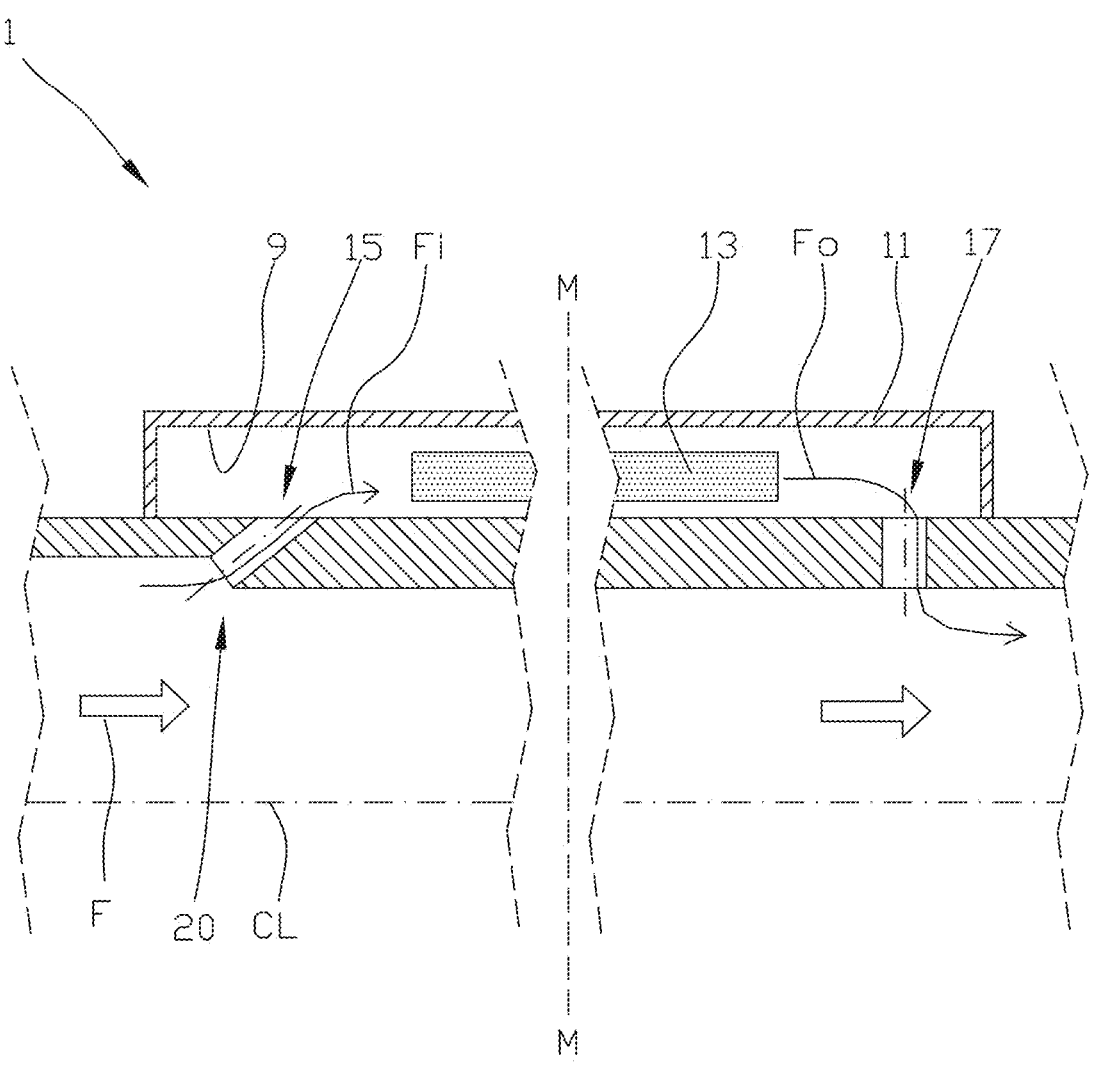
FIG. 2 shows in larger scale a cross section of an upper portion of another embodiment of the apparatus.
Figure 3A:
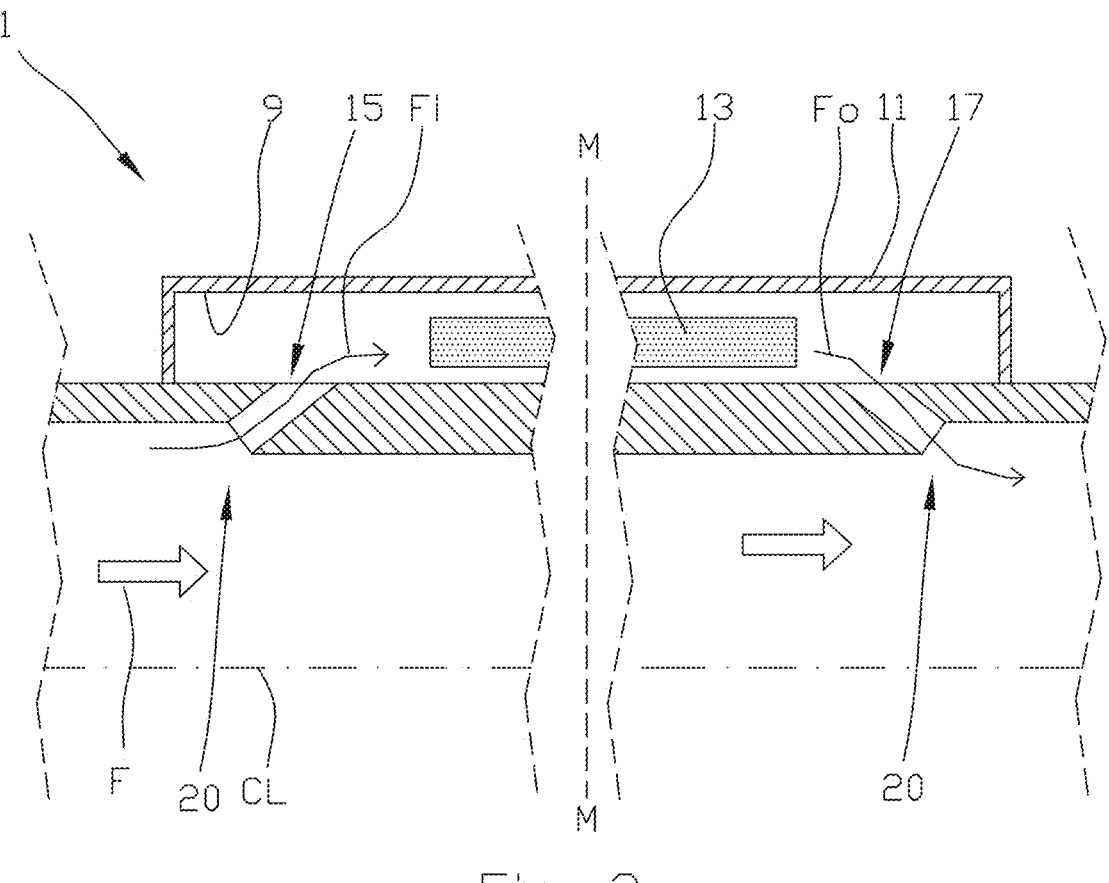
FIG. 3a shows a cross section of apparatus shown in FIG. 2 but in another configuration.

Some examples of suitable flow diverters are shown in FIGS. 1a, 2, and 3a.

In FIG. 1a, the flow diverter is provided by means of an obstruction 20 protruding from an inner surface of the pipe 3 downstream at an inlet of the at least one first passage 15, here shown as a bore having a longitudinal axis being perpendicular to a longitudinal axis L of the pipe 3. The obstruction 20 will provide a local increase of the pressure in the wellbore fluid within the pipe 3, and thus urge a portion of the fluid into and through the compartment 9, and out of the second passage 17, here shown as a bore having a longitudinal axis being perpendicular to a longitudinal axis L of the pipe 3. In a prototype of the apparatus 1 shown in FIG. 1a, an internal diameter of the pipe 3 was 125 mm, and the protrusion had a radial length of 2 mm.

As an alternative to, or in addition to providing the obstruction 20 at the inlet of the first passage 15, a similar obstruction (not shown) may be arranged upstream at an outlet of the second passage 17 to provide a local reduced pressure that will provide a suction at the second passage 17 and thus in the compartment 9.

FIG. 2 shows in larger scale a cross section of an upper portion of the apparatus 1, and an alternative embodiment of the flow diverter. The flow diverter is provided by means of a passage 15 having a longitudinal axis being inclined with respect to the longitudinal axis L of the pipe 3. The inlet of the first passage 15 at the inner surface of the pipe 3 is closer to the first end portion 5 of the pipe 3 than the portion of the first passage 15 facing the compartment 9.

The flow diverter shown in FIG. 2 is further provided by means of an obstruction provided by means of different internal diameters of the pipe 3; a first internal diameter from a downstream portion of the first passage 15, and a second internal diameter at an upstream portion of the first passage 15, wherein the first internal diameter is smaller than the second internal diameter of the pipe 3. Thus, a portion of the fluid flowing through the pipe 3, will be urged into the compartment 9. In the embodiment shown in FIG. 2, the second passage 17 has a similar configuration as the second passage shown in FIG. 1a.

In an alternative embodiment (not shown) the configuration of the first passage 15 and the second passage 17 is mirrored about the axis M-M, so that the flow diverter provides a locally reduced pressure at the outlet of the second passage 17, while the first passage 15 has a longitudinal axis being perpendicular to the longitudinal axis of the pipe 3. In such a configuration, a portion of the fluid flowing through the pipe 3 will be sucked through the compartment 9.

In still another embodiment of the apparatus 1, the flow diverter is provided by arranging at least one of the first passage 15 and the second passage 17 inclined as discussed above, but without any obstruction.

FIG. 3a discloses an embodiment of the apparatus 1 wherein both the first passage 15 is identical to the first passage 15 shown in FIG. 2, and wherein the configuration of the first passage 15 has been mirrored with about axis M-M to provide the second passage 17.

Independent of the embodiments shown in the FIGS. 1a, 2 and 3a, and the alternative embodiments not shown but discussed above, the flow diverter and the passages 15, 17 is configured for achieving a constant ratio between the fluid flowing through the compartment 9 and the flow through the pipe 3. Such a configuration may be made by using computer modelling based on finite element analysis.

Tests of the apparatus 1 according to the invention have shown that a ratio between the flow rate through the compartment 9 and the flow rate through the pipe 3 is sufficiently linear so that, when having estimated the flow rate through the compartment of the apparatus, this can be used for estimating a flow rate through the pipe 3 of the apparatus 1.

Figure 3B:
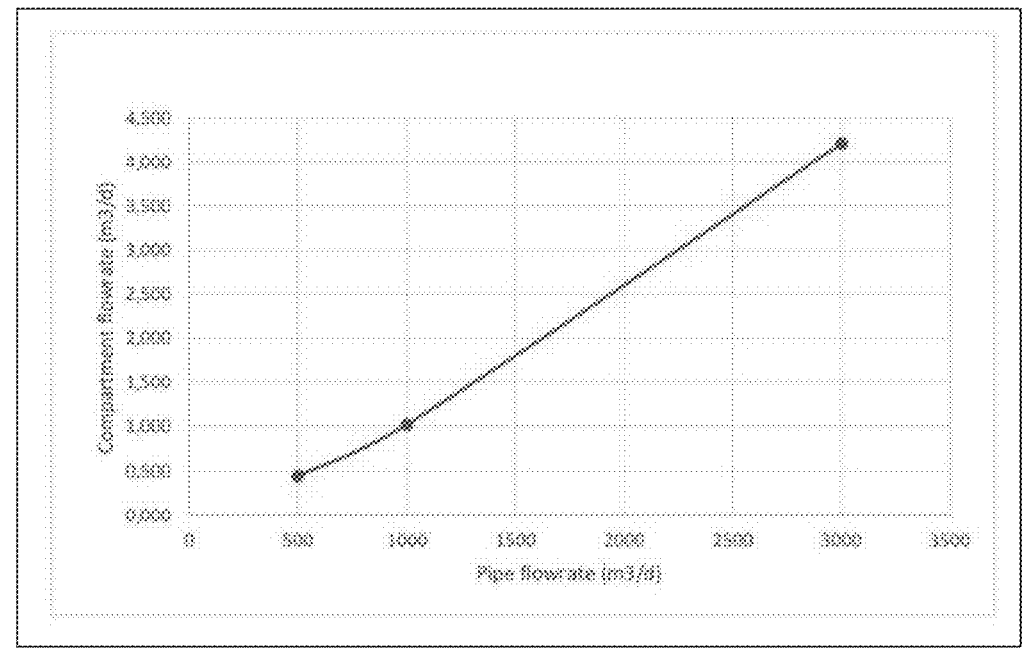
FIG. 3b shows a graph of a flow rate through compartment vs. flow rate passing the apparatus through the pipe of the apparatus.

FIG. 3b shows an example graph for a configuration of the apparatus 1 having an obstruction at a downstream portion of the first passage 15 as shown in FIG. 1a, and an additional obstruction corresponding to the obstruction at the inlet, at an upstream portion of the outlet of the second passage 17. A substantially linear graph is also achieved by the alternative configurations of the flow diverters 20 shown in FIGS. 2 and 3a. Both passages 15, 17 are in the form of 3 mm bores. The X-axis of the graph represents flow rates in m³/day through the pipe 3 between 0 and 3000 m³/day, and Y-axis of the graph represents flow rates in m³/day through the compartment 9 between 0 and 4.5 m³/day. The compartment 9 of the apparatus 1 represented by the graph has a length of 300 mm. Based on the graph, a flow rate through the pipe 3 of the apparatus 1 can be estimated based on an estimation of a flow rate through the compartment 9. An estimation of the flow rate through the compartment 9 can be obtained by accumulating within the compartment 9 tracer released from the source 13 of tracer material. Such accumulation is achieved by at least reducing production flow so that the amount of tracer being released for the source 13 of tracer material is larger than the amount of tracer being evacuated from the compartment 9 via the second passage 17. When a desired accumulation of released accumulation of tracer material within the compartment 9 is achieved (known from type of tracer source), the well is re-opened to a desired production rate, and samples of fluid are collected at topside of the well to record a time-window after the re-opening through which the accumulated tracer is detected. Thus, based on the time-window, a known volume of the compartment 9, and the known ratio between the flow through the compartment 9 and the flow through the pipe 3 of the apparatus 1, the flow rate at that the location of the apparatus 1 can be estimated.

A flow rate through the compartment 9 carrying the tracer can be estimated by the formula:

$$Q_9 = V_9 / t_9$$

$Q_9$: Flow rate through compartment 9

$V_9$: Volume of compartment 9, known from the design of the compartment 9

$t_9$: Time from start of arrival of tracer "shot", until end of tracer "shot".

When knowing the ratio between the flow through compartment 9 and the pipe 3 of the apparatus 1, the flow rate at the position of the apparatus 1 within the well, can be estimated.

The ratio between the flow through compartment 9 and the pipe 3 of the apparatus 1 can be found by mean of a known computer model, for example a CFD model, or by means of installing an additional apparatus downstream of all formation inflow zones of the wellbore. Such an additional apparatus is identical to the one or more apparatuses arranged upstream of said additional apparatus. The fluid rate passing such an additional apparatus will be identical to a fluid rate produced to surface out of the well, because no fluid is flowing into the well after having passed the additional apparatus.

By the latter method, the flow ratio R between the flow through the compartment 9 and the pipe 3 of the apparatus 1 can be found by the following formula:

$$R = QW/Q_s$$

QW: Flow rate measured at surface of the well;

$Q_s = V_s/t_s$: Well flow through compartment of the additional apparatus, measured at surface. Thus, for a wellbore production string comprising two or more identical apparatuses (in addition to said additional apparatus) a flow $Q_1$ at any one of the at least two apparatuses is found by the formula:

$$Q_1 = R \times Q_9 = R \times V_9/t_9.$$

Figure 4:
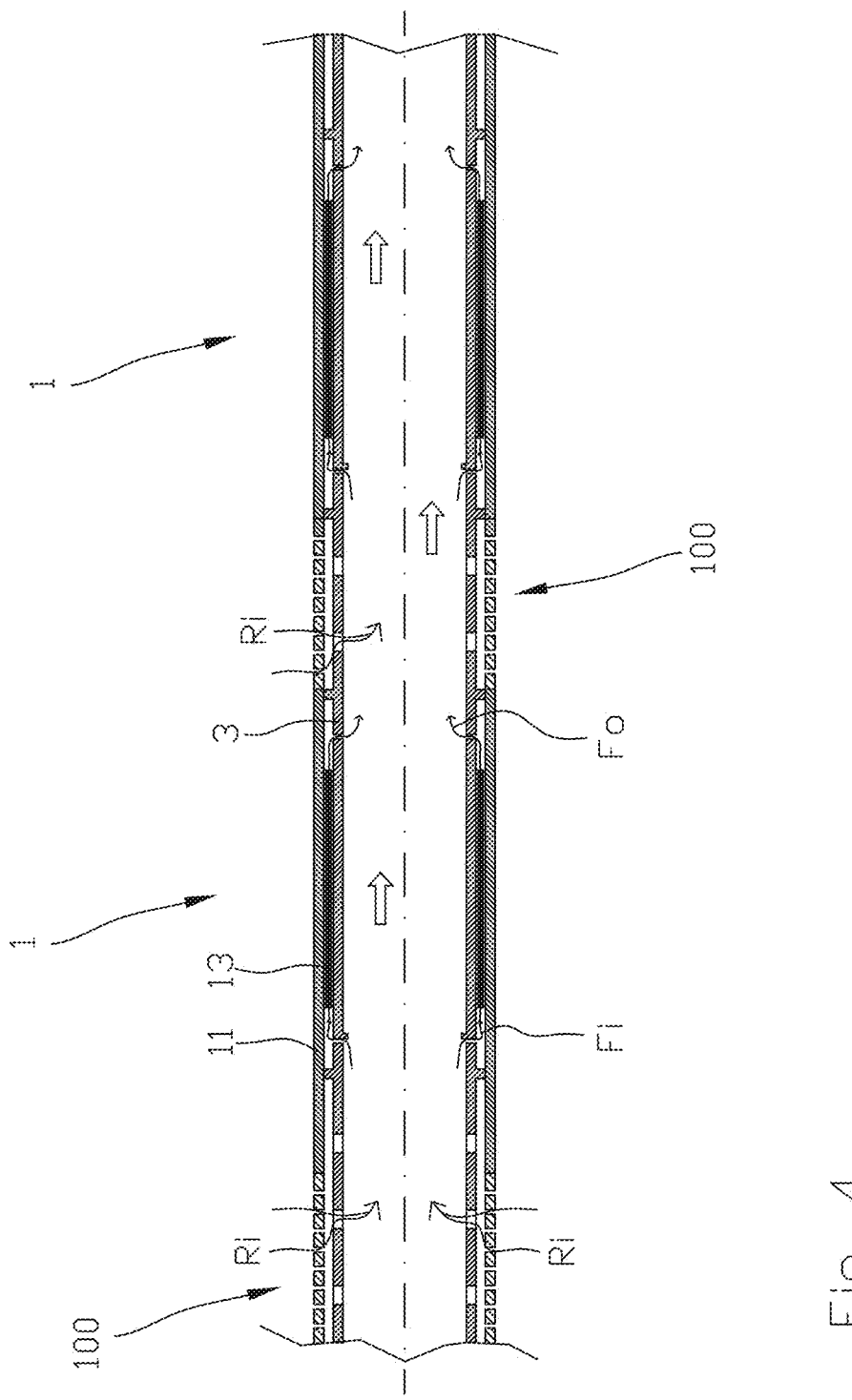
FIG. 4 shows in smaller scale a cross section of the two apparatus according to the invention connected to formation drainage devices arranged upstream of each apparatus.

Turning now to FIG. 4 showing a cross sectional view of a production string comprising two apparatuses 1 according to the invention connected to formation drainage devices 100 arranged upstream of each apparatus 1. The formation drainage devices 100 are of a type know per se for allowing formation fluid to flow into the wellbore production string as indicated by arrows Ri. In FIG. 4 the formation drainage devices 100 are connected immediately upstream of each apparatus 1. However, since the compartment 9 of the apparatus 1 according to the invention is in fluid communication only with the pipe 3 of the apparatus 1, and not an inflow zone of the well, each apparatus 1 may be arranged axially spaced-apart downstream of any inflow zone of the well. This is illustrated in FIG. 5 wherein a solid walled production liner 120 is arranged between the apparatus 1 and the formation drainage device 100.

Figure 5:
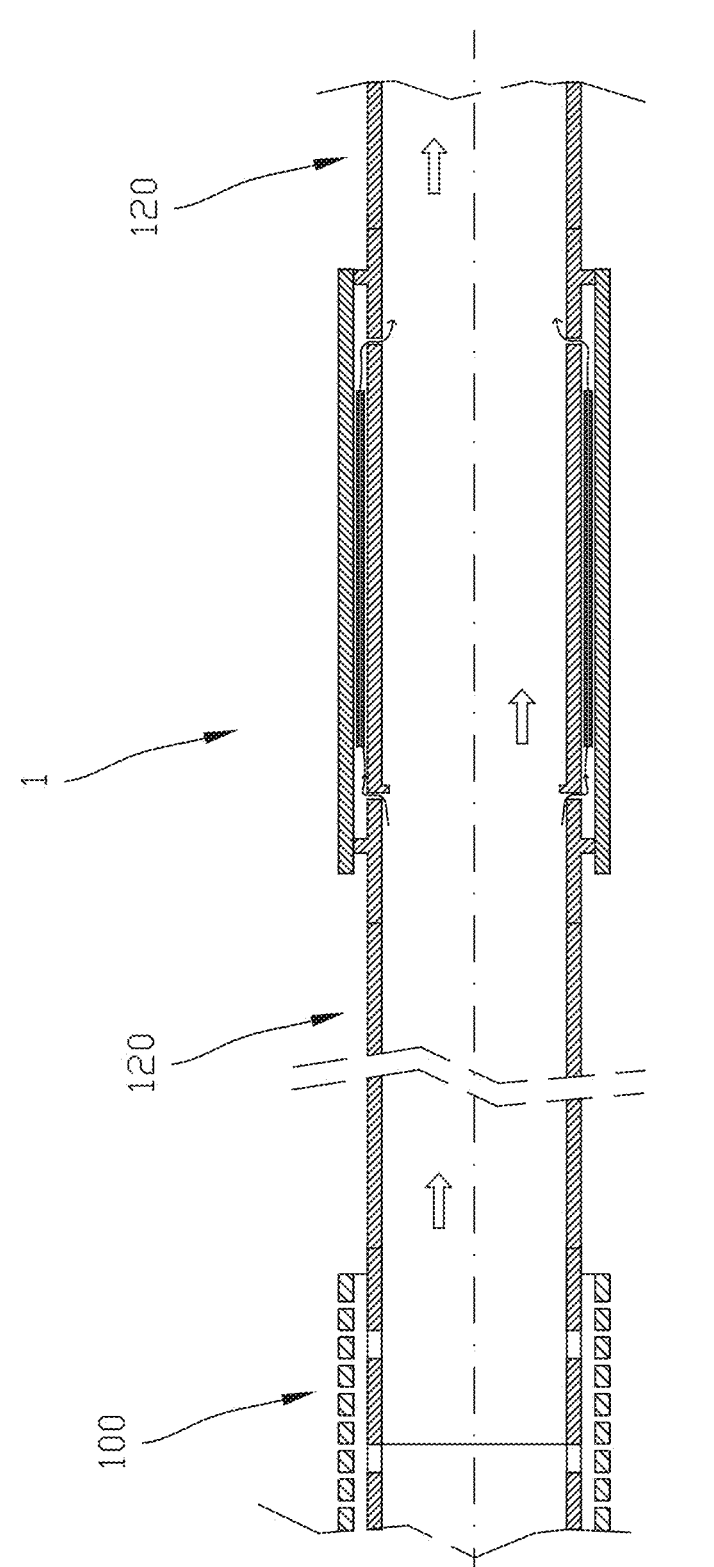
FIG. 5 shows a cross section of an apparatus according to the invention connected to a formation drainage device via a production pipe.

The apparatuses 1 shown in FIGS. 4 and 5 is configured in a similar way as the apparatus shown in FIG. 1.

FIG. 6a shows an apparatus initially tested by the inventor. The apparatus is similar the apparatus 1 according to the present invention, apart from that the apparatus shown in FIG. 6a does not comprise any flow diverter. The apparatus shown in FIG. 6a is therefore not part of the apparatus 1 according to the invention.

Figure 6B:
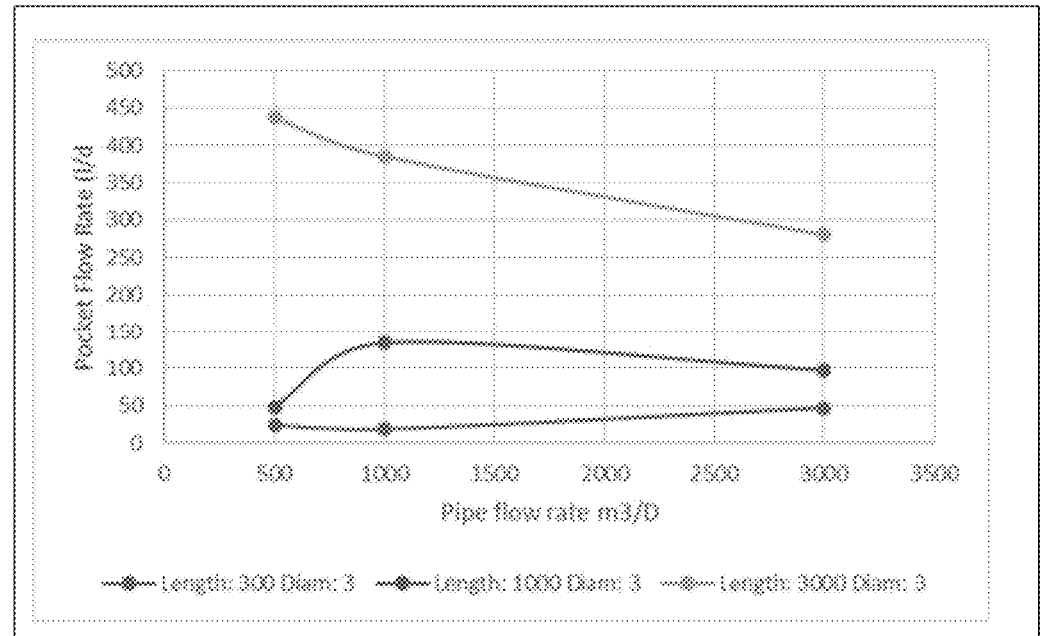

The tests of the apparatus configured as shown in FIG. 6a showed that a ratio between the flow through the compartment or pocket, and the flow rate through the pipe is non-linear, i.e., there is no linear or constant relationship between the flow rate through the compartment and the flow rate through the pipe. This is illustrated in FIG. 6b showing three graphs for various lengths of the compartment. The uppermost graph illustrating a result for an apparatus wherein an axial length of the compartment was 3000 mm. The graph shows that the higher flow rate through the pipe, the lower flow rate through the compartment. The middle graph illustrates a result for an apparatus wherein an axial length of the compartment was 1000 mm. The graph shows a similar result as the uppermost graph for a flow through the pipe exceeding 1000 m³/day. The lowermost graph illustrates the result of an apparatus wherein an axial length of the compartment was 300 mm. The lowermost graph shows that the flow through the compartment is substantially constant for any flow through the pipe of the apparatus shown in FIG. 6.

From the disclosure herein, it will be clear that the apparatus 1 is configured for estimating an inflow from a formation at any position upstream of the apparatus 1. The apparatus 1 is very reliable as it comprises no movable parts, and it does not negatively affect the production flow even after the tracer have been fully expended.

It should be noted that the above-mentioned embodiments shown in FIGS. 1-3a, and 4-5 illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. An apparatus for estimating a production flow rate at a certain position of a well, the apparatus comprises:
   a pipe for forming part of a production string in a wellbore, the pipe having a first end portion and a second end portion,
   a compartment arranged on an outside portion of the pipe, the compartment houses a source of releasable tracer, wherein the pipe is provided with at least one first passage through a wall of the pipe for communicating a portion of a wellbore fluid into the compartment, and a least one second passage for communicating the portion of the wellbore fluid that has passed through the first passage, and tracer being released from the source of tracer material, back into the pipe, wherein the portion of wellbore fluid within the pipe is urged through the compartment by a non-movable flow diverter provided at least at one of the at least one first passage and the at least one second passage, and wherein the flow diverter and the passages are configured so that, in use in a producing well, a ratio between a flow (Fi, Fo) through the compartment and a flow (F) through the pipe is constant, wherein said constant ratio is known from tests and/or calculations.

2. The apparatus according to claim 1, wherein the flow diverter is provided by an obstruction protruding from an inner surface of the pipe downstream at an inlet of the at least one first passage.

3. The apparatus according to claim 1, wherein the flow diverter is provided by arranging the at least one first passage inclined so that an inlet of the at least one first passage at an inner surface of the pipe is closer to the first end portion of the pipe than the portion of the at least one first passage facing the compartment.

4. The apparatus according to claim 2, wherein the flow diverter is provided by a combination of the obstruction and the inclined passage.

5. The apparatus according to claim 1, wherein the flow diverter is provided by an obstruction protruding from an inner surface of the pipe upstream at an outlet of the at least one second passage.

6. The apparatus according to claim 1, wherein the flow diverter is provided by arranging the at least one second passage inclined so that an outlet of the at least one the second passage at an inner surface of the pipe is closer to the second end portion of the pipe than the portion of the at least one second passage facing the compartment.

7. A wellbore production string comprising the apparatus according to claim 1, and a formation drainage device for allowing formation fluid to flow into the wellbore production string, wherein the drainage device is arranged upstream the apparatus.

8. The wellbore production string according to claim 7 comprising at least two apparatuses arranged alternating with the formation drainage devices.

9. A method for estimating a production flow rate at a certain position of a well, wherein the method comprising:
  inserting into a wellbore a production string comprising the apparatus according to claim 1 and a formation drainage device arranged upstream of the apparatus, and start producing the well;
  when production flow through the apparatus is to be estimated, at least reducing production flow to allow tracer being released from the source of tracer material to accumulate in the compartment of the apparatus;
  re-open the well to a desired production flow rate and collect samples of fluid at a topside of the well to detect tracer concentration from the accumulated tracer in the production flow to record a time-window after the re-opening through which the accumulated tracer is detected; and
  based on the time window, a known volume of the compartment, and the known ratio between the flow through the compartment and the flow through the pipe of the apparatus, estimating a flow rate at that the location of the apparatus.

10. The method according to claim 9, wherein the method comprises providing the wellbore production string with two or more apparatuses and appurtenant formation drainage devices.

11. The method according to claim 10, comprising providing at least neighbouring apparatuses with sources of distinctive tracer material.

12. The apparatus according to claim 3, wherein the flow diverter is provided by a combination of an obstruction and the inclined passage.

13. The apparatus according to claim 2, wherein the flow diverter is provided by an obstruction protruding from an inner surface of the pipe upstream at an outlet of the at least one second passage.

14. The apparatus according to claim 3, wherein the flow diverter is provided by an obstruction protruding from an inner surface of the pipe upstream at an outlet of the at least one second passage.

15. The apparatus according to claim 4, wherein the flow diverter is provided by an obstruction protruding from an inner surface of the pipe upstream at an outlet of the at least one second passage.

16. The apparatus according to claim 2, wherein the flow diverter is provided by arranging the at least one second passage inclined so that an outlet of the at least one the second passage at the inner surface of the pipe is closer to the second end portion of the pipe than the portion of the at least one second passage facing the compartment.

17. The apparatus according to claim 3, wherein the flow diverter is provided by arranging the at least one second passage inclined so that an outlet of the at least one the second passage at the inner surface of the pipe is closer to the second end portion of the pipe than the portion of the at least one second passage facing the compartment.

18. The apparatus according to claim 4, wherein the flow diverter is provided by arranging the at least one second passage inclined so that an outlet of the at least one the second passage at the inner surface of the pipe is closer to the second end portion of the pipe than the portion of the at least one second passage facing the compartment.

19. The apparatus according to claim 5, wherein the flow diverter is provided by arranging the at least one second passage inclined so that an outlet of the at least one the second passage at the inner surface of the pipe is closer to the second end portion of the pipe than the portion of the at least one second passage facing the compartment.

20. A wellbore production string comprising the apparatus according to claim 2, and a formation drainage device for allowing formation fluid to flow into the wellbore production string, wherein the drainage device is arranged upstream the apparatus.

* * * * *